(12) United States Patent
Nepil

(10) Patent No.: US 7,131,216 B2
(45) Date of Patent: Nov. 7, 2006

(54) DISTANCE MEASURING APPARATUS

(75) Inventor: Mark Nepil, Carpentersville, IL (US)

(73) Assignee: Keson Industries Inc., Aurora, IL (US)

( * ) Notice: Subject to any disclaimer, the term of this patent is extended or adjusted under 35 U.S.C. 154(b) by 0 days.

(21) Appl. No.: 10/925,650

(22) Filed: Aug. 25, 2004

(65) Prior Publication Data

US 2006/0042112 A1    Mar. 2, 2006

(51) Int. Cl.
*G01B 3/12* (2006.01)

(52) U.S. Cl. .......................................... 33/772; 33/779

(58) Field of Classification Search .................. 33/533, 33/772–782, 711, 734, 1 H, 746–749, 521, 33/39.1, 34–38
See application file for complete search history.

(56) References Cited

U.S. PATENT DOCUMENTS

| | | | | | |
|---|---|---|---|---|---|
| 2,033,970 A | * | 3/1936 | Anderson | ...................... | 33/775 |
| 2,327,657 A | * | 8/1943 | Middleton | ..................... | 33/773 |
| 2,716,819 A | * | 9/1955 | Staples | ......................... | 33/781 |
| 3,151,397 A | * | 10/1964 | King et al. | .................... | 33/782 |
| 4,276,695 A | * | 7/1981 | Stansbury, Jr. | ............... | 33/781 |
| 4,989,342 A | * | 2/1991 | Nosek | .......................... | 33/780 |
| 5,430,906 A | * | 7/1995 | Drury | .......................... | 15/160 |
| 5,443,125 A | * | 8/1995 | Clark et al. | .................. | 172/608 |
| 5,884,711 A | * | 3/1999 | Shoup | ......................... | 172/610 |
| 6,334,630 B1 | * | 1/2002 | Barros, Sr. | ................... | 280/855 |
| 6,612,774 B1 | * | 9/2003 | Dulin | ......................... | 404/104 |
| 2004/0016070 A1 | * | 1/2004 | Nemcek | ...................... | 15/53.4 |
| 2004/0123480 A1 | * | 7/2004 | Olson et al. | .................. | 33/772 |

* cited by examiner

*Primary Examiner*—Yaritza Guadalupe-McCall
(74) *Attorney, Agent, or Firm*—Wood, Phillips, Katz, Clark & Mortimer

(57) ABSTRACT

A distance measuring apparatus having a frame and a wheel rotatable relative to the frame around a first axis. The wheel has a peripheral surface that can be rolled against a surface upon which a distance measurement is to be taken. The distance measuring apparatus further has a counter assembly through which advancement of the distance measuring device can be converted to a distance measurement. The scraper assembly has a scraping edge that is one of (a) adjacent to the wheel, and (b) against the wheel. The scraping edge intercepts foreign matter adhered to the wheel as the wheel is rotated around the first axis to avoid buildup of foreign matter upon the wheel as the distance measuring apparatus is operated.

29 Claims, 6 Drawing Sheets

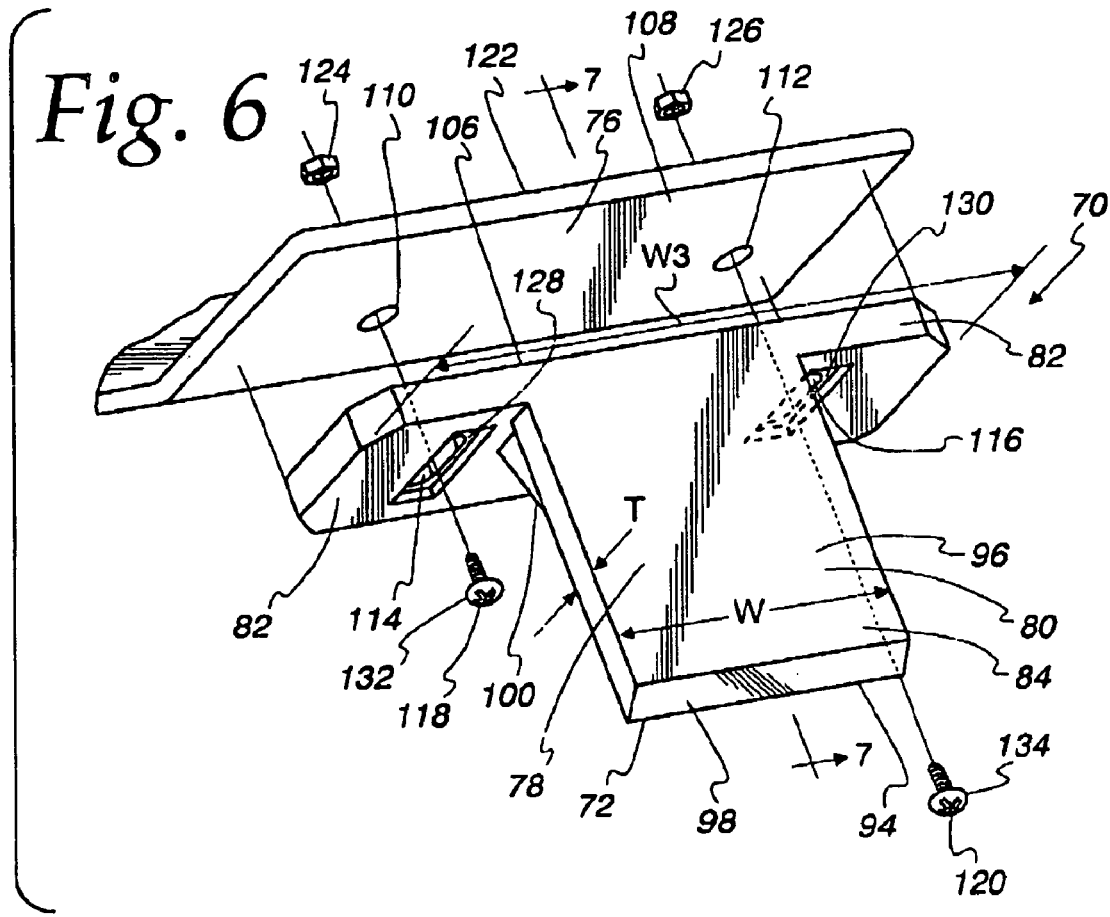
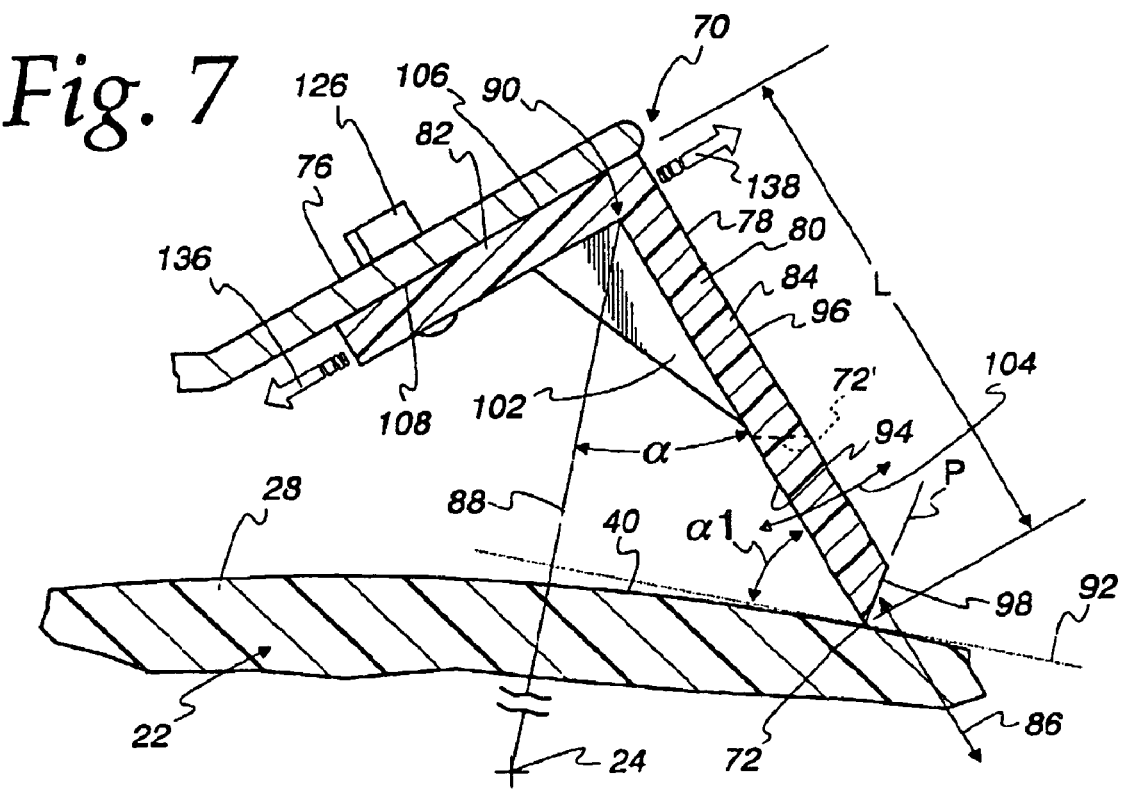

DISTANCE MEASURING APPARATUS

BACKGROUND OF THE INVENTION

1. Field of the Invention

This invention relates to distance measuring apparatus of the type having a rotatable wheel and, more particularly, to a distance measuring apparatus having a scraper assembly with a scraping edge for intercepting foreign matter adhered to the wheel as the wheel is rotated.

2. Background Art

Distance measuring apparatus utilizing rotatable wheels are well known in the art. In a typical construction, a frame supports a wheel for rotation around an axis. The frame has an associated handle which can be grasped to manipulate the frame and thereby roll the wheel against a surface upon which a distance measurement is to be taken. A counter is activated as the wheel is rotated and converts rotation to a distance measurement, which is digitally or mechanically displayed. This conversion is based upon the diameter for the wheel. That is, each wheel rotation is correlated to a distance traversed by the wheel which is equal to the wheel circumference.

Wheeled distance measuring apparatus are used in a wide range of environments. These apparatus are commonly used by the construction industry on sites at which terrain and conditions may be quite harsh. It is common for those utilizing wheeled distance measuring apparatus to encounter muddy conditions that may be aggravated when there is precipitation.

As a result of using wheeled distance measuring apparatus in the above-described environments, there is a tendency of foreign matter, such as chunks of earth, or the like, to adhere to the wheel. The adhered foreign matter has a number of undesirable effects. First, foreign matter at discrete locations on the wheel periphery may preclude smooth rolling of the wheel over the underlying terrain. A significant buildup may ultimately produce interference between the wheel and other parts of the apparatus, thereby impairing operation. To eliminate this latter problem, the user may be required to manually scrape the foreign matter off of the wheel. To accomplish this, the user may have to interrupt the measuring process and use a separate utensil to scrape the wheel periphery. Aside from the obvious inconvenience, this process may result in a compromise of the accuracy of the measurements by reason of not resuming the measuring process at the precise point at which it was interrupted.

Most significantly, the accumulation of foreign matter upon the wheel increases the effective circumference of the outer surface which rolls against the underlying surface upon which a measurement is taken. Foreign matter may progressively accumulate on the wheel and go virtually undetected by the user. Eventually, the foreign matter may accumulate to the point that an appreciable change in the effective diameter of the wheel results. Over long distances, a deviation from true measurement may result that is significant.

The industry continues to seek out new designs for distance measuring apparatus which are capable of taking accurate distance measurements even on rough and potentially wet and muddy terrain.

SUMMARY OF THE INVENTION

In one form, the invention is directed to a distance measuring apparatus having a frame and a wheel rotatable relative to the frame around a first axis. The wheel has a peripheral surface that can be rolled against a surface upon which a distance measurement is to be taken. The distance measuring apparatus further has a counter assembly through which advancement of the distance measuring device can be converted to a distance measurement. The scraper assembly has a scraping edge that is one of (a) adjacent to the wheel, and (b) against the wheel. The scraping edge intercepts foreign matter adhered to the wheel as the wheel is rotated around the first axis to avoid buildup of foreign matter upon the wheel as the distance measuring apparatus is operated.

In one form, the peripheral surface has a first portion with a first shape and the scraping edge is at least nominally conformed to the first shape.

The first shape may be substantially flat as viewed in cross section through a plane containing the first axis.

In one form, the frame has a bracket and the scraper assembly includes a blade assembly which is separate from and attached to the bracket.

In one form, the blade assembly has an L-shaped body with a mounting leg that is attached to the bracket and a cleaning leg on which the scraping edge is defined.

In one form, the cleaning leg projects in cantilever fashion away from the mounting leg along a first line.

In one form, the cleaning leg projects from the mounting leg at a first location, and an angle defined between the first line and a radial line between the first axis and the first location is less than 90°.

The angle may be on the order of 60°.

In one form, the cleaning leg has a thickness defined between first and second substantially planar surfaces and a free end surface that extends between the first and second planar surfaces. The free end surface is non-orthogonal to the first and second planar surfaces. The scraping edge is defined at a juncture between the first planar surface and the free end surface.

The scraping edge may be defined by a non-metal material.

In one form, the bracket has a cantilevered wall to which the mounting leg is attached.

In one form, the cleaning leg is substantially flat. At least one reinforcing gusset may extend between the mounting and cleaning legs.

In one form, the blade assembly has a body that is mounted to the bracket so that the scraping edge can be repositioned relative to the wheel.

In one form, the scraping edge is repositionable selectively towards and away from a portion of the peripheral surface of the wheel.

The scraping edge may be repositionable selectively radially towards and away from a portion of the peripheral surface of the wheel relative to the first axis.

In one form, one of the body and bracket has an elongate slot, with the other of the body and bracket having an opening. A securable fastener is extended through the elongate slot and opening and secured to selectively fix the body to the bracket in any of a plurality of different positions.

In one form, the scraper assembly has a cantilevered cleaning leg on which the scraping edge is defined and the cleaning leg extends along a first line that makes an acute angle with a line tangent to a radially outwardly facing portion of the peripheral surface of the wheel. The cleaning leg is oriented to produce a chiseling action on foreign matter adhered to the wheel.

In one form, the L-shaped body is a single, molded, plastic piece.

In one form, the thickness of the cleaning leg is such that the cleaning leg can flex so that the scraping edge can be moved generally radially towards and away from the wheel relative to the first axis.

In one form, the thickness of the cleaning leg is on the order of ⅛ inch.

In one form, the first and second planar surfaces each have a substantially squared shape.

In one form, the mounting leg and cleaning leg each have a width along the first axis. The width of the mounting leg is greater than the width of the cleaning leg.

In one form, the scraping edge is selectively movable relative to the wheel.

In one form, the scraping edge is movable selectively from a first position against the wheel to a second position spaced from the wheel.

In one form, the cleaning leg is constructed so that the cleaning leg can wear away to a worn state. In the worn state, the scraping edge is selectively movable relative to the wheel to against the wheel.

In one form, the cleaning leg has a length along the first line and, in the worn state, the length of the cleaning leg is reduced by approximately one third.

The length of the cleaning leg in the worn state may be reduced by one half or more than one half.

BRIEF DESCRIPTION OF THE DRAWINGS

FIG. 6 is an enlarged, exploded, fragmentary, perspective view of the inventive scraper assembly and a bracket on the distancing measuring apparatus to which the scraper assembly is attached;

FIG. 7 is an enlarged, cross-sectional view of the scraper assembly taken along line 7—7 of FIG. 6 and in relationship to a portion of the wheel on the distance measuring apparatus;

DETAILED DESCRIPTION OF THE DRAWINGS

Figure 1:
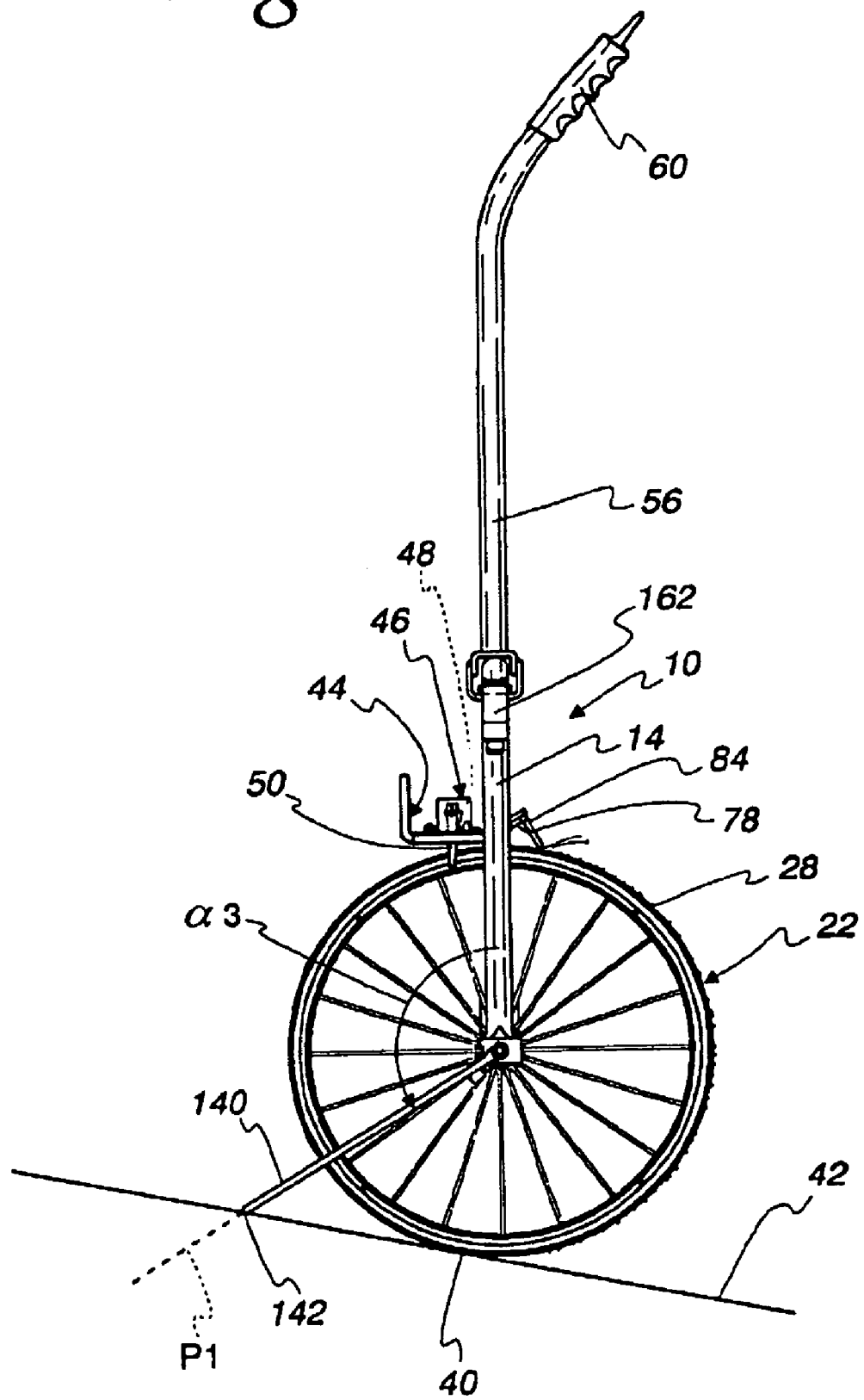
FIG. 1 is a side elevation view of a wheeled distance measuring apparatus in an operative state and including a scraper assembly, according to the present invention, for separating foreign matter adhered to the wheel on the distance measuring apparatus.

As seen in FIGS. 1–9, a distance measuring apparatus, according to the present invention, is shown at 10. The distance measuring apparatus 10 consists of a frame 12 including a U-shaped tubular element 14 having a bight portion 16 from which spaced legs 18,20 depend.

A wheel 22 is mounted to the frame 12 for rotation relative thereto around an axis 24. More specifically, the wheel 22 consists of a central hub 26 and a tire 28 that is concentric with the hub 26. The tire 28 may be made from a plastic or rubber material that is formed around a rim 30.

A plurality of spokes 32 extend between the hub 26 and rim 30. A mounting shaft 34 projects through the hub 26 and legs 18,20, to be exposed at the external sides thereof. Nuts 36 secure the shaft 34 relative to the legs 18,20 to maintain the wheel 22 in an operative position on the frame 12, wherein the wheel 22 is guided in rotation around the axis 24. The tire 28 on the wheel 22 has a peripheral surface 38 with a radially outwardly facing portion 40 that can be rolled against a surface 42 upon which a distance measurement is to be taken.

The frame 12 includes a support 44 for a portion of a counter assembly 46. The counter assembly 46 includes a converting mechanism 48 with a trigger/actuator 50 that resides in the path of, and is engaged by, cantilevered pins 52 that project axially from the rim 30. The pins 52 are equidistantly spaced around the circumference of the rim 30.

The trigger/actuator 50 is pivotable between first and second positions, and normally biased into the first position therefor. The trigger/actuator 50 is configured so that as the wheel 22 is rotated around the axis 24, each pin 52 encounters the trigger/actuator 50 and moves the trigger/actuator 50 from the first position therefor into the second position. The pin 52 then moves past the trigger/actuator 50, which thereafter moves from the second position back into the first position to be engaged by the following pin 52. Each time the trigger/actuator 50 is moved from the first position into the second position therefor, the converting mechanism 48 is operated to cause an incremental change in distance to be registered and depicted on a digital or mechanical display 54. As the wheel 22 is rolled against the underlying surface 42 through a full revolution, a distance measurement is displayed corresponding to the circumference of the surface portion 40. The details of the counter assembly 46 are not critical to the present invention as myriad different types of counter assembly, through which rotation of a wheel can be converted to a distance measurement, are well known to those skilled in this art. The invention contemplates potentially other mechanisms for converting movement of a wheeled distance measuring apparatus 10 to a readable distance measurement.

The frame 12 includes an elongate, tubular handle 56 with an offset end 58 to which a grippable element 60 is attached. The grippable element 60 is situated so that in the operative state of FIG. 2, the grippable element 60 can be comfortably grasped and pushed in a forward direction, as indicated by the arrow 62. This causes the wheel 22 to roll against the underlying surface 42 and rotate in the direction of the arrow 64 around the axis 24.

As mentioned in the Background portion herein, as the wheel 22 rolls against the underlying surface 42, foreign matter 68 tends to adhere primarily to the tire 28. The invention is focused primarily on the structure that prevents a detrimental accumulation of foreign matter 68 on the tire 28, and particularly on the radially outwardly facing portion 40 of the peripheral surface 38 on the wheel 22.

Figure 5:
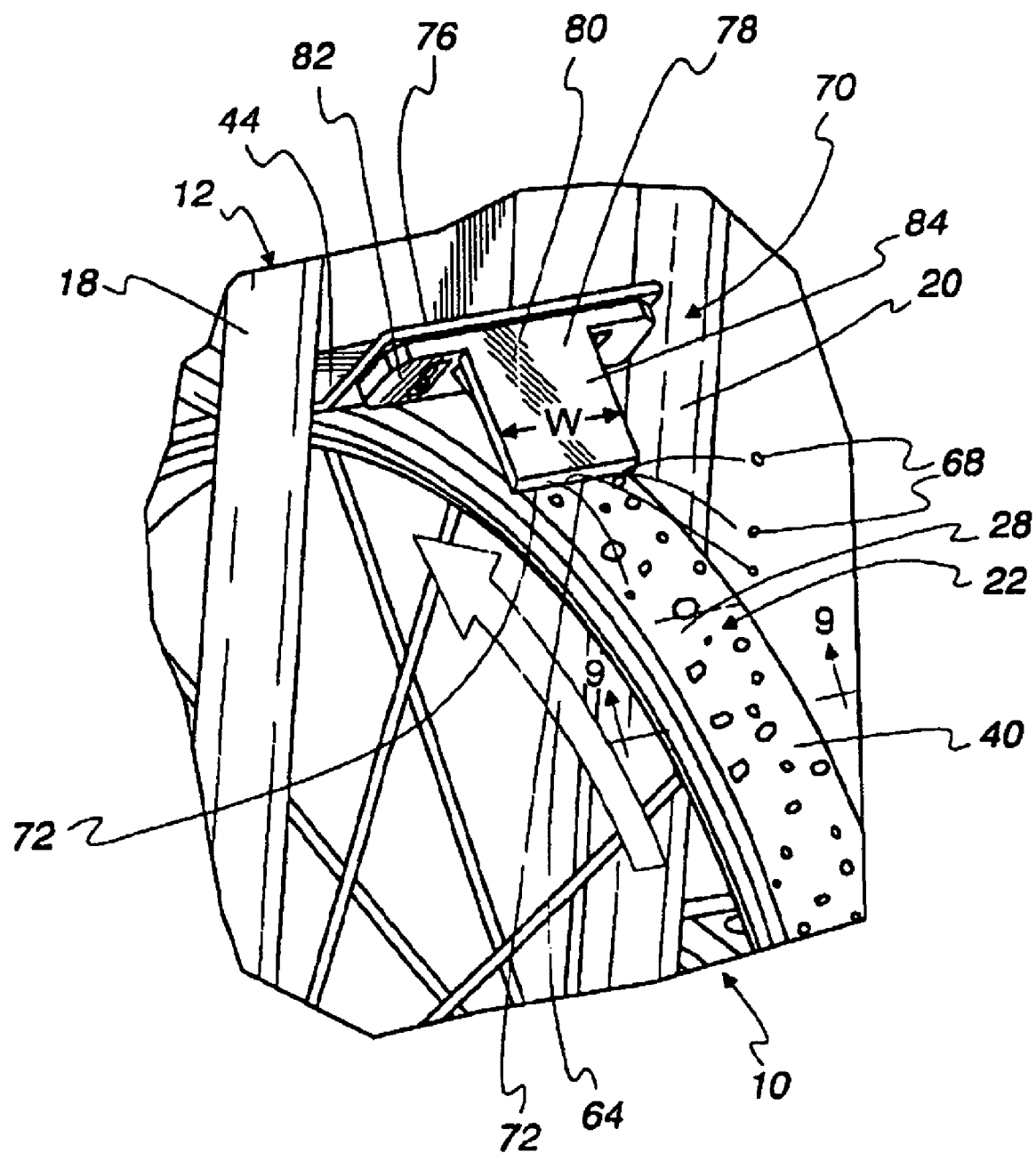
FIG. 5 is an enlarged, fragmentary, perspective view of the inventive scraper assembly on the distance measuring device in FIGS. 1–4.
Figure 8:
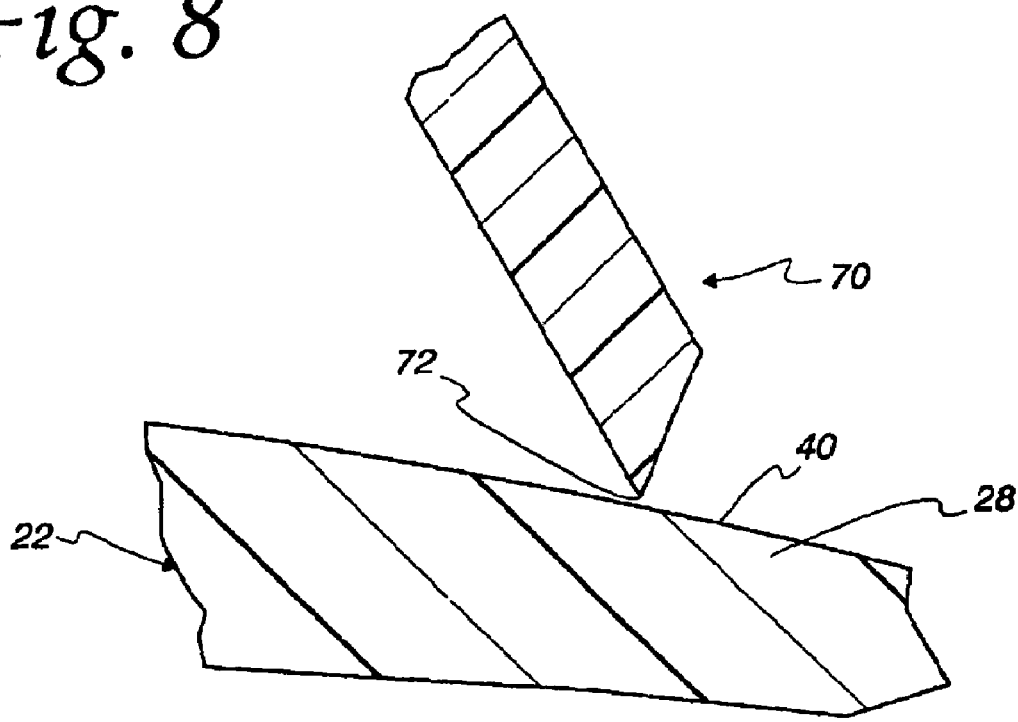
FIG. 8 is a view as in FIG. 7 wherein a scraping edge on the scraper assembly is slightly spaced from the wheel.

More particularly, the invention is directed to a scraper assembly at 70 which defines a scraping edge 72 that can be selectively placed either (a) adjacent to the surface portion 40, as shown in FIG. 8, or against the surface portion 40, as shown in FIG. 7. As the wheel 22 is rotated around the axis 24, the scraping edge 72 intercepts the foreign matter 68 adhered to the wheel 22 and causes the foreign matter 68 to be separated from the wheel 22, as shown in FIG. 5.

Figure 9:
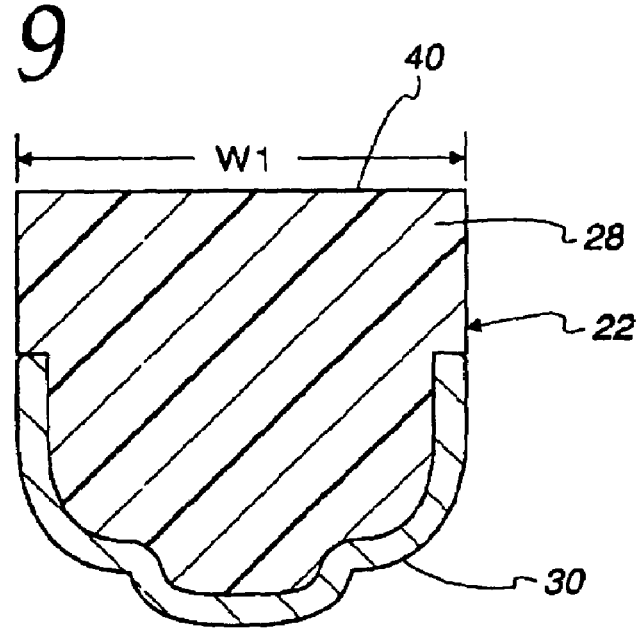
FIG. 9 is a cross-sectional of the wheel on the distance measuring apparatus taken along line 9—9 of FIG. 5.

As shown in FIG. 9, the surface portion 40 has a shape that is substantially flat, as viewed in cross section through a plane containing the first axis. The scraping edge 72 has a conforming straight shape to at least nominally match the shape of the surface portion 40. Preferably, the scraping edge 72 has a width W that is at least equal to, and more preferably slightly exceeds, the width W1 of the peripheral surface portion 40 on the wheel 22 so that cleaning of the entire width of the surface portion 40 is effected during operation. It should also be understood that the portion 40 of the wheel 22 that is designed to roll against an underlying surface need not be flat, as shown. The flat shape is preferred. However, if a non-flat shape is utilized, it is preferred that the scraping edge 72 have at least a nominally conforming shape thereto.

The frame 12 includes a bracket 76 that is cantilevered off of the support 44. The bracket 76 consists of a generally flat plat which projects angularly upwardly away from the support 44. The bracket 76 may be configured to flex slightly to facilitate cleaning of the wheel 22 by the scraper assembly 70, as hereinafter described.

The scraper assembly 70 includes a blade assembly 78 which is separate from, and attached to, the bracket 76. The blade assembly 78 has an L-shaped body 80 with a mounting leg 82 that is attached to the bracket 76 and a cleaning leg 84 on which the scraping edge 72 is defined. The cleaning leg 84 projects in cantilever fashion away from the mounting leg 82 along a first line, as indicated by the double-headed arrow 86 (FIG. 7).

More specifically, the cleaning leg 84 projects from the mounting leg 82 at an angle $\alpha$, between the first line 86 and a radial line 88, between the axis 24 and a first juncture location at 90 from which the cleaning leg 84 projects from the mounting leg 82. The angle$\alpha$ is less than 90° and preferably on the order of 60° or less. The orientation of the cleaning leg 84 can be further described as defining an acute angle $\alpha1$ between the first line 86 and a line 92 tangent to the surface portion 40. With this orientation, the scraping edge 72 produces a leading, chisel action on foreign matter 68 adhered to the wheel 22 for positive cleaning thereof. This is as opposed to a less effective sweeping action that would result in the scraping edge 72 operated on the wheel 22 in a trailing manner. While not preferred, this trailing action is still contemplated by the invention.

The cleaning leg 84 has a thickness T (FIG. 6) defined between first and second substantially planar, oppositely facing, surfaces 94,96. A free end surface 98 extends between the planar surfaces 94,96 and resides in a plane P that is nonorthogonal to the first and second surfaces 94. The scraping edge 72 is defined at a juncture between the planar surface 94 and the free end surface 98.

In a preferred form, the L-shaped body 80 is formed as one piece, as by molded plastic. It is preferred that at least the scraping edge 72 be defined by a non-metal material. The thickness T of the substantially flat cleaning leg 84 may be on the order ⅛ inch. The cleaning leg 84 is reinforced by a pair of spaced, gussets 100,102 extending between the cleaning leg 84 and mounting leg 82. The gussets 100,102 extend from the first location 90 to a midportion of the cleaning leg 84. With this arrangement, the free end of the cleaning leg 84 is allowed to flex, as by bending in the direction of the double-headed arrow 104. This allows the scraping edge 72 to be deflected radially outwardly by tenaciously adhered foreign matter 68 so that the plate assembly 78 does not block rotation of the wheel 72 when this condition is encountered.

The body 80 is mounted to the bracket 76 so that the scraping edge 72 can be repositioned relative to the wheel 22. More specifically, the mounting leg 82 has a flat surface 106 that can be placed facially against a flat surface 108 on the bracket 76. The bracket 76 has spaced through openings 110,112 which align with elongate slots 114,116 through the mounting leg 82. The opening 110 is registrable with the slot 114 simultaneously as the opening 112 is registrable with the slot 116. Separate fasteners 118,120 can be directed through the aligned openings and slots 110,114; 112,116, respectively, so that the fasteners 118,120 are exposed at the bracket surface 122 facing oppositely to the surface 108. Nuts 124,126 can be engaged respectively, with the exposed parts of the fasteners 118,120 and secured to fix the relative positions of the bracket 76 and L-shaped body 80. The mounting leg 82 has undercuts 128,130 around the slots 114,116 to seat the heads 132,134 of the fasteners 118,120 in a recessed manner.

The slots 114,116 allow the mounting leg 82 to be shifted relative to the bracket 76 oppositely along a line parallel to the length of the slots 114,116, as indicated by the arrows 136,138, with the fasteners 118,120 in place but not securely tightened through the nuts 124,126. Movement in the mounting leg 82 in the direction of the arrow 136 brings the scraping edge 72 radially inwardly towards the surface portion 40 of the wheel 22. Movement of the direction of the arrow 138 causes the scraping edge 72 to be moved radially outwardly and away from the surface portion 40. By securing the fasteners 118,120, the scraping edge 72 can be fixed in a desired relationship with the wheel 22 selected from any of a plurality of different positions relative thereto.

It should be understood that slots could be provided on the bracket 76 and through bores provided on the mounting leg 82 to allow the same adjusting capability for the L-shaped body 80. Alternatively, slots could be provided on both the bracket 76 and the L-shaped body 80.

In the embodiment shown, the planar surfaces 94,96 of the cleaning leg 84 have a generally squared shape and more particularly a rectangular configuration with a longer dimension in the direction of the line 86. The mounting leg 82 has a width W3 that is greater than the width W for the cleaning leg 84. This makes possible positive securing of the mounting leg 82 relative to the bracket 76 while affording the desired flexibility for the cleaning leg 84.

In the embodiment shown, the tire 28 is made preferably from rubber, or the like. The scraper edge 72, and preferably the entire cleaning leg 84, are made from a material that will not damage the tire 28 after continuous movement thereagainst to effect the cleaning action as the distance measuring apparatus 10 is operated. Preferably, the material defining the mounting leg 82 will have sufficient rigidity that the scraping edge 72 will effectively clean the entire width of the surface portion 40. Typical materials that are suitable for this purpose will tend to progressively wear after extended contact with foreign matter 68 and the tire 22. It is anticipated that a substantial portion of the length L of the mounting leg 82 may wear down after extensive use. As shown in dotted lines in FIG. 7, this progressive wear may eventually cause a substantial portion of the length L to be eliminated, whereby ultimately a worn state results wherein the scraping edge 72' becomes reconfigured and relocated relative to the bracket 76, as shown in dotted lines. As the wear progresses, the L-shaped body 80 can be shifted by the operator in the direction of the arrow 136 to maintain the edge 72,72' at, or in the desired proximity to, the surface portion 40. With the configuration shown, the cleaning leg 84 can be worn to a state, wherein the length L is reduced by one third, one half, or even more and still be adjusted to situate the scraping edge where required to effect the necessary cleaning action. The L-shaped body 80 lends itself to being replaced by a component of like configuration when the wear becomes excessive, a condition that may be realized when the length L is reduced to the point that the flexibility is detrimentally diminished for the cleaning leg 84 and/or the scraping edge 72,72' cannot be placed in a desired cleaning relationship to the surface portion 40.

The scraper assembly 70 thus can be used to effectively clean the wheel 22 to maintain a constant diameter for the surface portion 40 to assure consistent and predictable measurements. The cleaning leg 84 is preferably flexible enough that there will be little interference encountered either with or without foreign matter 68 adhered to the surface portion 40.

The distance measuring apparatus 10 includes other features which are not critical to operation of the present invention. A U-shaped base/stand 140 is secured to the ends of the shaft 34 and maintained in operative position by the nuts 36. A center line of the base/stand 140 resides in a plane P1 that makes an angle α3 with the lengthwise centers of the legs 18,20. The angle α3 is on the order of 120°. With this arrangement, the distance measuring apparatus 10 can be stored in an upright position, as shown in FIGS. 1 and 2, by the surface portion 40 and the bottom 142 of the base/stand 140.

The base/stand 140 has spaced, discrete, U-shaped support legs 144,146 which are simultaneously engageable with the underlying support surface 42. The legs 144,146 may both be engageable within an irregular, underlying surface 42 to provide a three point contact to stably support the distance measuring apparatus 10 in an upright orientation.

Figure 2:
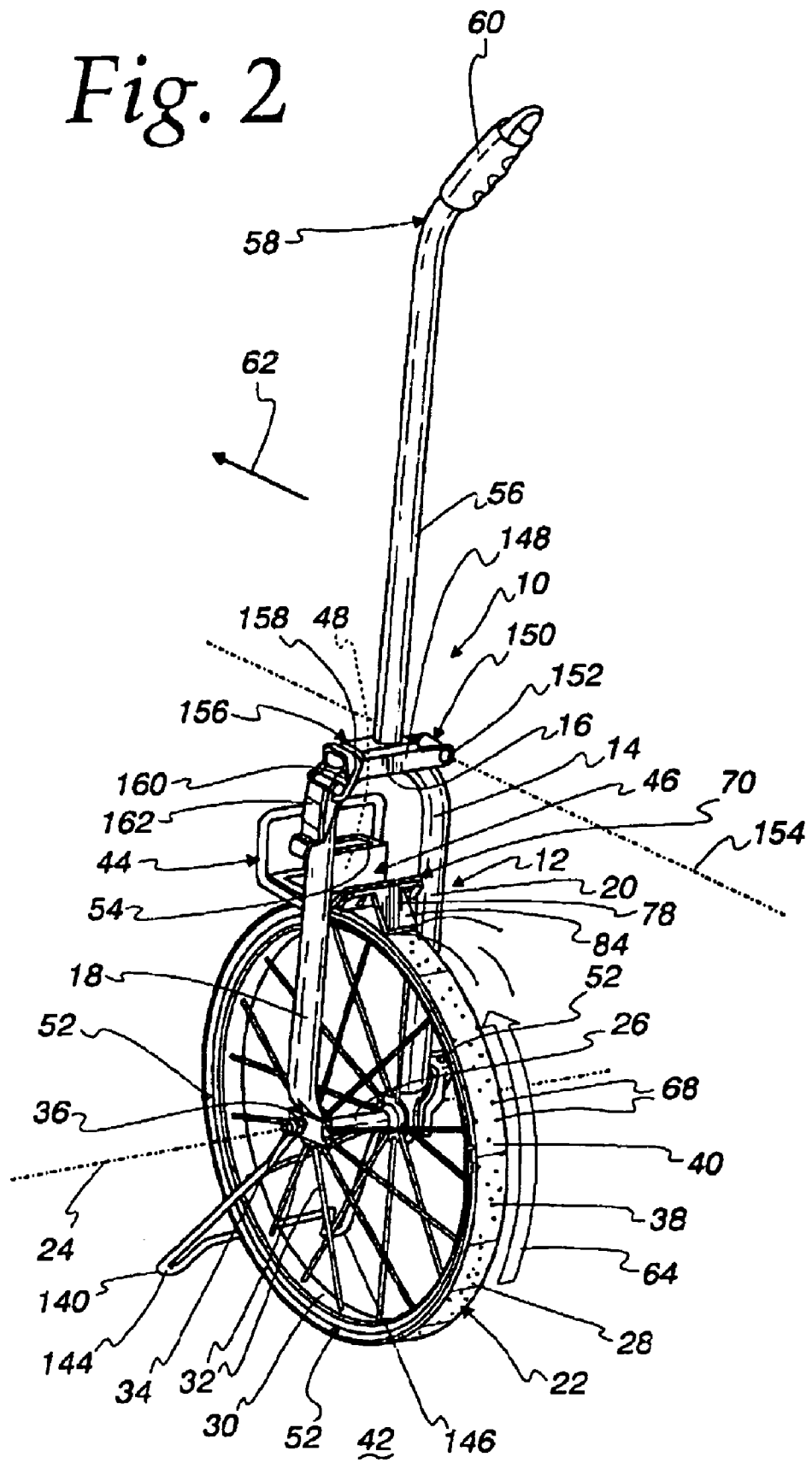
FIG. 2 is a rear perspective view of the distance measuring apparatus in FIG. 1.
Figure 3:
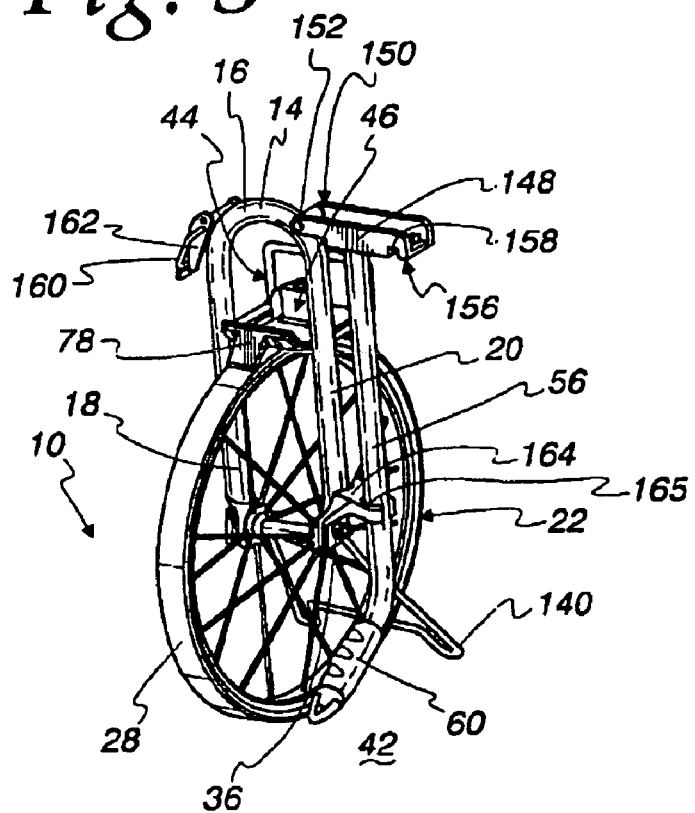
FIG. 3 is a rear perspective view of the distance measuring apparatus of FIGS. 1 and 2 in a stored state.
Figure 4:
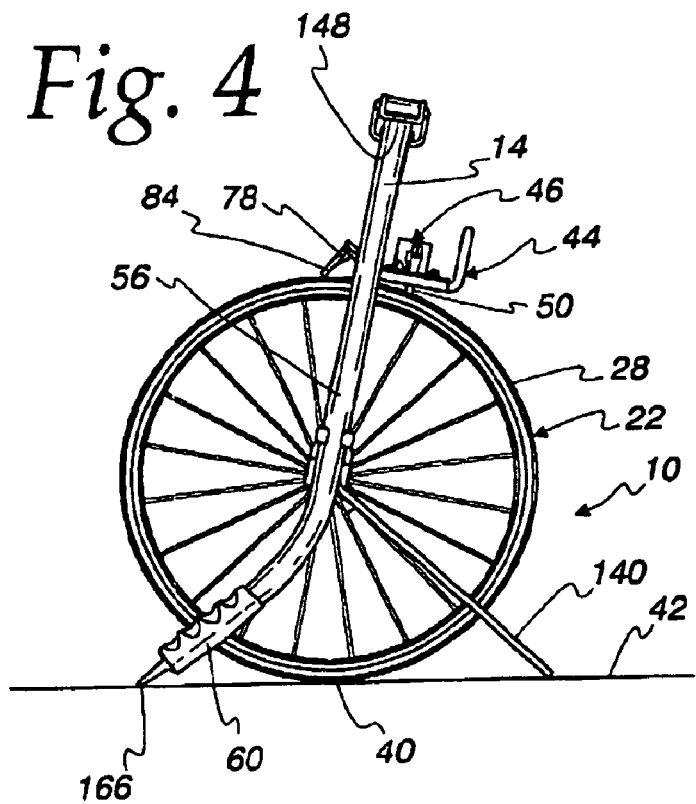
FIG. 4 is a side elevational view of the distance measuring apparatus in the FIG. 3 state.

In this embodiment, the handle 56 is foldable between an operative state, as shown in FIGS. 1 and 2, and a stored state, as shown in FIGS. 3 and 4. The handle 56 is mounted to a U-shaped beam element 148. One end 150 of the beam element 148 is connected to the U-shaped element 114 through a pin 152, about which the handle 56 pivots between the operative and stored positions. The pin 152 defines a pivot axis 154 that is generally parallel to a plane orthogonal to the axis 24 and bisecting the width W1 of the tire 28.

The opposite end 156 of the beam element 148 defines a slot 158 to receive a catch element 160 which can be operated by an over center handle 162 to bear the beam end 156 against the tubular element 14 and thereby maintain the handle 56 in the operative position. The details of a suitable structure for pivoting the handle 56 and maintaining the same in operative and stored positions is described in U.S. patent application Ser. No. 10/331,751, entitled "Wheeled Distance Measuring Device" which is incorporated herein by reference.

Preferably, the center line of the handle 56 coincides with a plane that is orthogonal to the axis 24 and bisects the width W1 of the tire 22. Through this arrangement, an advancing force applied by a user through the handle 60 does not tend to skew the wheel 22 from a straight line path.

The leg 20 on the tubular element 14 carries a clip 164 defining a receptacle 165 into which the handle 56 can be releasably snap fit to maintain the handle 56 in the stored position of FIGS. 3 and 4. In the stored position, the distance measuring apparatus 10 can be placed in the orientation shown in FIGS. 3 and 4, wherein there is a four point contact with the underlying surface 42. That is, the free end 166 of the grippable element 60 engages the underlying surface 42 simultaneously with the wheel surface portion 40 and the support legs 144,146 on the base/stand 140.

While the invention has been described with particular reference to the drawings, it should be understood that various modifications could be made without departing from the spirit and scope of the present invention.

The invention claimed is:

1. A distance measuring apparatus comprising:

a frame;

a wheel rotatable relative to the frame around a first axis;

the wheel having a peripheral surface that can be rolled against a surface upon which a distance measurement is to be taken;

a counter assembly through which advancement of the distance measuring device can be converted to a distance measurement; and a scraper assembly comprising a scraping edge that can be selectively fixed in a plurality of different positions relative to the frame so as to be one of (a) adjacent to the wheel, and (b) against the wheel, the scraping edge intercepting foreign matter adhered to the wheel as the wheel is rotated around the first axis to avoid buildup of foreign matter upon the wheel as the distance measuring apparatus is operated, wherein the frame comprises a bracket and the scraper assembly comprises a blade assembly that is separate from and attached to the bracket, wherein the blade assembly comprises an L-shaped body with a mounting leg that is attached to the bracket and a transverse cleaning leg on which the scraping edge is defined, wherein the cleaning leg has a thickness defined between first and second substantially planar surfaces and a free end surface that extends between the first and second planar surfaces, wherein the free end surface is non-orthogonal to the first and second planar surfaces and the scraping edge is defined at a juncture between the first planar surface and the free end surface.

2. The distance measuring apparatus according to claim 1 wherein the peripheral surface has a first portion with a first shape, and the scraping edge is at least nominally conformed to the first shape.

3. The distance measuring apparatus according to claim 2 wherein the first shape is substantially flat as viewed in cross section through a plane containing the first axis.

4. The distance measuring apparatus according to claim 1 wherein the cleaning leg projects in cantilever fashion away from the mounting leg along a first line up to the scraping edge, the first line non-parallel to the first axis.

5. The distance measuring apparatus according to claim 4 wherein the cleaning leg projects from the mounting leg at a first location and an angle defined between the first line and a radial line between the first axis and the first location is less than 90°.

6. The distance measuring apparatus according to claim 5 wherein the angle is on the order of 60°.

7. The distance measuring apparatus according to claim 4 wherein the cleaning leg is constructed so that the cleaning leg can wear away to a worn state and in the worn state the scraping edge is selectively movable relative to the wheel to against the wheel.

8. The distance measuring apparatus according to claim 7 wherein the cleaning leg has a length along the first line and in the worn state the length of the cleaning leg is reduced by approximately one third.

9. The distance measuring apparatus according to claim 7 wherein the cleaning leg has a length along the first line and in the worn state the length of the cleaning leg is reduced by approximately one half.

10. The distance measuring apparatus according to claim 7 wherein the cleaning leg has a length along the first line and in the worn state the length of the cleaning leg is reduced by more than one half.

11. The distance measuring apparatus according to claim 1 wherein the scraping edge is defined by a non-metal material.

12. The distance measuring apparatus according to claim 1 wherein the bracket has a cantilevered wall to which the mounting leg is attached.

13. The distance measuring apparatus according to claim 1 wherein the cleaning leg is substantially flat and at least one reinforcing gusset extends between the mounting and cleaning legs.

14. The distance measuring apparatus according to claim 1 wherein the blade assembly comprises a body that is mounted to the bracket so that the scraping edge can be repositioned relative to the wheel.

15. The distance measuring apparatus according to claim 14 wherein the scraping edge is repositionable selectively towards and away from a portion of the peripheral surface of the wheel.

16. The distance measuring apparatus according to claim 15 wherein the scraping edge is repositionable selectively radially towards and away from a portion of the peripheral surface of the wheel relative to the first axis.

17. The distance measuring apparatus according to claim 14 wherein one of the body and bracket has an elongate slot, the other of the body and bracket has an opening, and a securable fastener is extended through the elongate slot and opening and secured to selectively fix the body to the bracket in any of a plurality of different positions.

18. The distance measuring apparatus according to claim 1 wherein the scraper assembly comprises a cantilevered cleaning leg on which the scraping edge is defined and the cleaning leg extends along a first line that makes an acute angle with a line tangent to a radially outwardly facing portion of the peripheral surface of the wheel and is oriented to produce a chiseling action on foreign matter adhered to the wheel.

19. The distance measuring apparatus according to claim 1 wherein the L-shaped body comprises a single molded plastic piece.

20. The distance measuring apparatus according to claim 1 wherein the thickness of the cleaning leg is on the order of ⅛ inch.

21. The distance measuring apparatus according to claim 1 wherein the first and second planar surfaces each have a substantially squared shape.

22. The distance measuring apparatus according to claim 1 wherein the mounting leg has a width along the first axis, the cleaning leg has a width along the first axis and the width of the mounting leg is greater than the width of the cleaning leg.

23. The distance measuring apparatus according to claim 1 wherein the scraping edge is movable selectively from a first position against the wheel to a second position spaced from the wheel.

24. A distance measuring apparatus comprising:
a frame;
a wheel rotatable relative to the frame around a first axis;
the wheel having a peripheral surface that can be rolled against a surface upon which a distance measurement is to be taken;
a counter assembly through which advancement of the distance measuring device can be converted to a distance measurement; and
a scraper assembly comprising a scraping edge that can be selectively fixed in a plurality of different positions relative to the frame so as to be one of (a) adjacent to the wheel, and (b) against the wheel,
the scraping edge intercepting foreign matter adhered to the wheel as the wheel is rotated around the first axis to avoid buildup of foreign matter upon the wheel as the distance measuring apparatus is operated,
wherein the scraper assembly comprises a blade assembly comprising a cleaning leg on which the scraping edge is defined and that has a thickness and projects in cantilever fashion a distance along a first line, the thickness and distance are such that the cleaning leg can flex by bending so that the scraping edge can be moved generally radially towards and away from the wheel relative to the first axis, the first line non-parallel to the first axis.

25. A distance measuring apparatus comprising:
a frame having a bracket with a surface facing in a first direction;
a wheel rotatable relative to the frame around a first axis;
the wheel having a peripheral surface that can be rolled against a surface upon which a distance measurement is to be taken;
a counter assembly through which advancement of the distance measuring device can be converted to a distance measurement; and
a scraper assembly comprising a scraping edge that is one of (a) adjacent to the wheel, and (b) against the wheel,
the scraping edge intercepting foreign matter adhered to the wheel as the wheel is rotated around the first axis to avoid buildup of foreign matter upon the wheel as the distance measuring apparatus is operated,
wherein the scraper assembly comprises a body with a mounting leg that abuts to a bracket surface and a cleaning leg that projects in cantilever fashion from the mounting leg in a line extending generally in the first direction,
wherein the scraper assembly comprises a blade assembly comprising a cleaning leg on which the scraping edge is defined and that has a thickness and projects in cantilever fashion a distance along a first line, the thickness and distance are such that the cleaning leg can flex by bending so that the scraping edge can be moved generally radially towards and away from the wheel relative to the first axis, the first line non-parallel to the first axis.

26. The distance measuring apparatus according to claim 25 wherein the cleaning leg is substantially flat and at least one reinforcing gusset extends between the mounting and cleaning legs.

27. The distance measuring apparatus according to claim 25 wherein the body is mounted to the bracket so that the scraping edge can be repositioned relative to the wheel.

28. The distance measuring apparatus according to claim 27 wherein the scraping edge is repositionable selectively towards and away from a portion of the peripheral surface of the wheel.

29. The distance measuring apparatus according to claim 25 wherein the mounting leg and cleaning leg comprise a single molded plastic piece.

* * * * *